(12) United States Patent
Ryzer

(10) Patent No.: US 10,875,072 B2
(45) Date of Patent: Dec. 29, 2020

(54) USE OF A SUPERSONIC FLUIDIC OSCILLATOR IN SUPERPLASTIC FORMING AND SYSTEM FOR SAME

(71) Applicant: Eugene Ryzer, Windsor (CA)

(72) Inventor: Eugene Ryzer, Windsor (CA)

(*) Notice: Subject to any disclaimer, the term of this patent is extended or adjusted under 35 U.S.C. 154(b) by 278 days.

(21) Appl. No.: 16/063,581

(22) PCT Filed: Aug. 31, 2017

(86) PCT No.: PCT/CA2017/051026
§ 371 (c)(1),
(2) Date: Jun. 18, 2018

(87) PCT Pub. No.: WO2018/049511
PCT Pub. Date: Mar. 22, 2018

(65) Prior Publication Data
US 2019/0001389 A1    Jan. 3, 2019

Related U.S. Application Data

(60) Provisional application No. 62/396,479, filed on Sep. 19, 2016.

(51) Int. Cl.
*B21D 26/027* (2011.01)
*B21D 26/055* (2011.01)
(Continued)

(52) U.S. Cl.
CPC ......... *B21D 26/027* (2013.01); *B21D 26/055* (2013.01); *B21D 35/008* (2013.01);
(Continued)

(58) Field of Classification Search
CPC .. B21D 26/027; B21D 26/041; B21D 26/055; B21D 35/008
(Continued)

(56) References Cited

U.S. PATENT DOCUMENTS 4,474,044 A    10/1984 Leistner et al.
5,309,747 A    5/1994 Yasui
(Continued)

FOREIGN PATENT DOCUMENTS

| CN | 101791651 A | 8/2010 |
| DE | 4441192 C2 | 5/1998 |
| JP | H07116748 A | 5/1995 |

OTHER PUBLICATIONS

NASA "Numerical Studies of a Supersonic Fluidic Diverter Actuator for Flow Control" (NASA/TM-2010-216805), Oct. 2010.
(Continued)

*Primary Examiner* — Shelley M Self
*Assistant Examiner* — Fred C Hammers
(74) *Attorney, Agent, or Firm* — Westman, Champlin & Koehler. P.A.

(57) ABSTRACT

A method of forming a material using a supersonic fluidic oscillator in a superplastic forming process and a related system. Pressurized gas, at a baseline pressure, is applied to a surface of the material when the material is received within a cavity of a forming tool. Pressure fluctuations, relative to the baseline pressure within the tool cavity, are created with a supersonic fluidic oscillator. Each pressure fluctuation (i) deforms the material and (ii) subsequently allows for a partial stress relief of the material during the forming process.

17 Claims, 13 Drawing Sheets

(51) Int. Cl.
  *B21D 35/00* (2006.01)
  *B29C 51/10* (2006.01)
  *B29C 51/46* (2006.01)
  *B29C 51/00* (2006.01)

(52) U.S. Cl.
  CPC .............. *B29C 51/10* (2013.01); *B29C 51/46* (2013.01); *B29C 51/008* (2013.01)

(58) Field of Classification Search
  USPC .......................................... 72/28, 60, 61, 62
  See application file for complete search history.

(56) References Cited

U.S. PATENT DOCUMENTS

| | | | |
|---|---|---|---|
| 5,419,170 A | 5/1995 | Sanders et al. | |
| 5,449,109 A | 9/1995 | Chuang et al. | |
| 5,649,438 A * | 7/1997 | Hall, Jr. ................ | B21D 26/025 72/60 |
| 6,253,588 B1 | 7/2001 | Rashid et al. | |
| 6,282,934 B1 * | 9/2001 | Bikert .................. | B21D 26/037 72/58 |
| 6,305,203 B1 | 10/2001 | Yasui | |
| 6,810,709 B2 | 11/2004 | Hammar et al. | |
| 7,024,897 B2 * | 4/2006 | Pfaffmann ........... | B21D 26/033 148/520 |
| 7,112,249 B2 | 11/2006 | Schroth et al. | |
| 7,159,437 B2 | 1/2007 | Schroth et al. | |
| 7,669,450 B2 * | 3/2010 | Friedman ............. | B21D 26/055 72/60 |
| 2009/0272167 A1 * | 11/2009 | Golovashchenko ... | B21D 22/30 72/56 |
| 2010/0095724 A1 | 4/2010 | Kotagiri et al. | |
| 2014/0130560 A1 * | 5/2014 | Cook ................... | B21D 26/033 72/61 |
| 2015/0352558 A1 * | 12/2015 | Lansell ................ | B01J 8/002 241/1 |

OTHER PUBLICATIONS

NASA "Numerical Studies of an Array of Fluidic Diverter Actuators for Flow Control" (NASA/TM-2011-217259), Nov. 2011.
International Search Report and Written Opinion Issued in PCT Application No. PCT/CA2017/051026, dated Nov. 21, 2017.

* cited by examiner

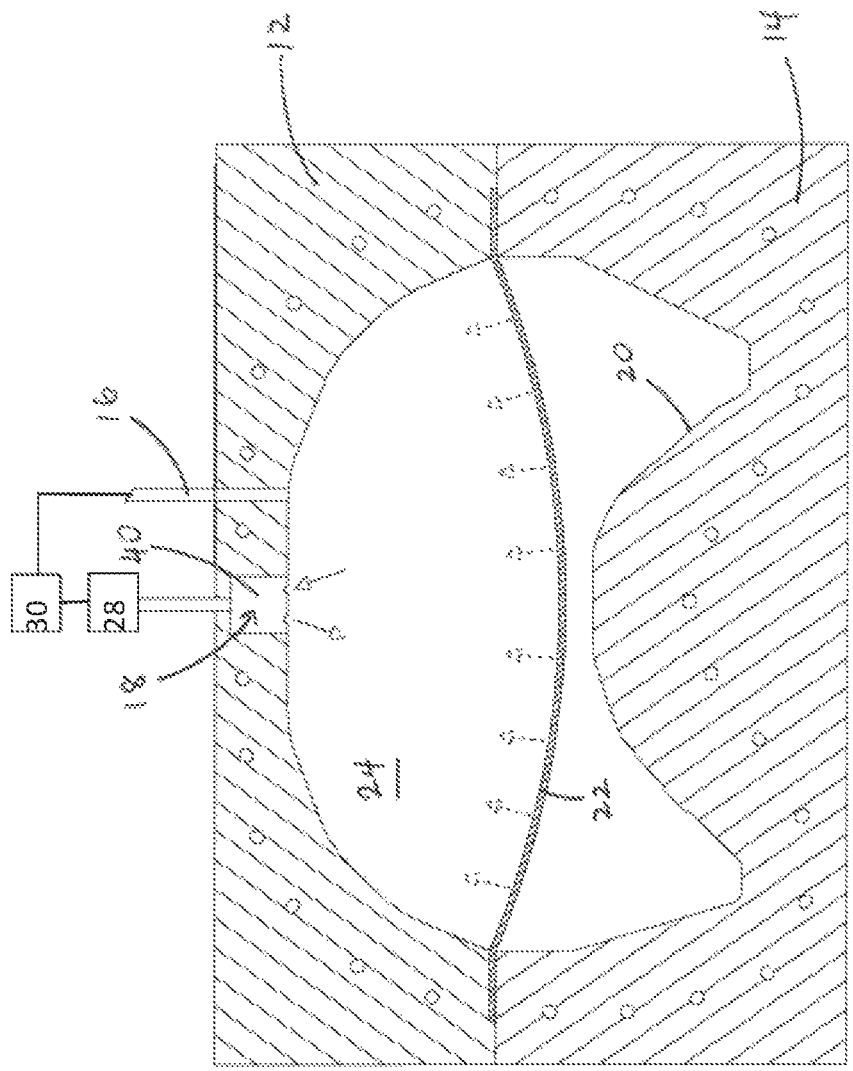

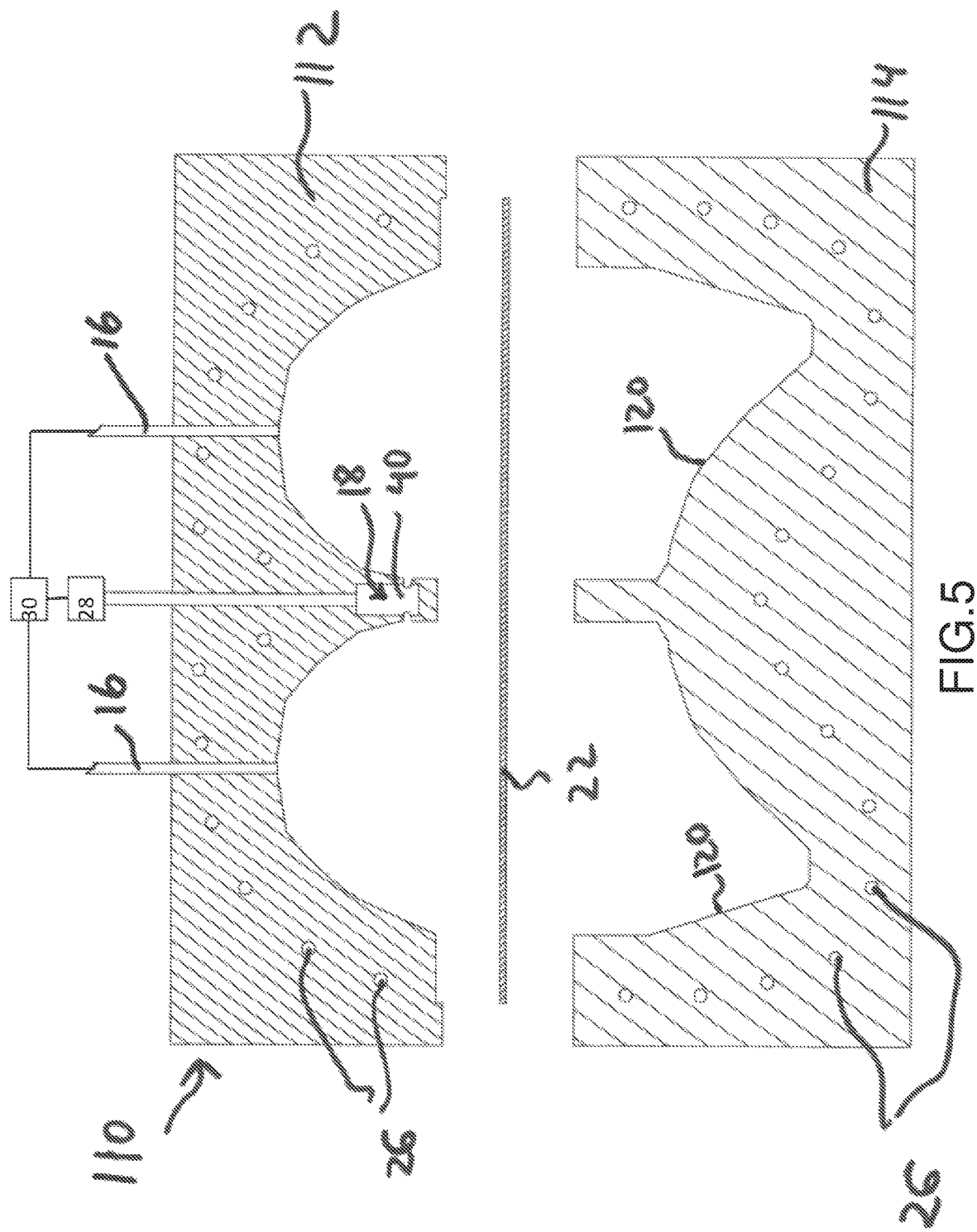

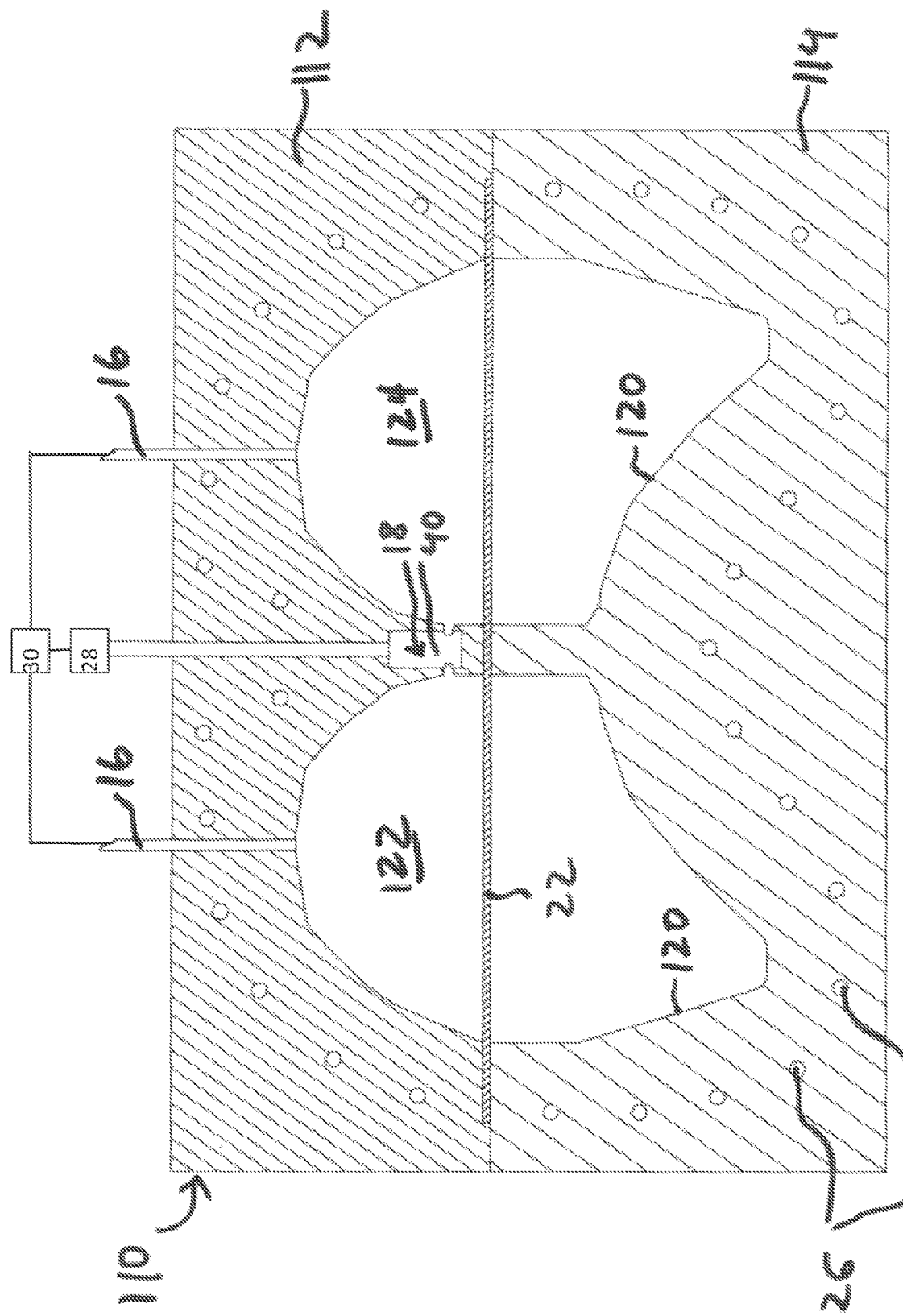

US 10,875,072 B2

USE OF A SUPERSONIC FLUIDIC OSCILLATOR IN SUPERPLASTIC FORMING AND SYSTEM FOR SAME

CROSS-REFERENCE TO RELATED APPLICATION(S)

This Application is a Section 371 National Stage Application of International Application No. PCT/CA2017/051026, filed Aug. 31, 2017, and claims priority to U.S. Provisional Patent Application Ser. No. 62/396,479, filed Sep. 19, 2016, of which the contents of each is hereby incorporated by reference in its entirety.

FIELD OF INVENTION

This invention relates to a method and system for forming shaped parts. In an embodiment, the invention relates to use of a supersonic fluidic oscillator coupled to a forming tool that causes fluctuation in the forming pressure of the gas during a superplastic forming process.

BACKGROUND

A superplastic forming process can be used to create a wide variety of different products, including many parts or components used in the automotive and aerospace industry. Typically, superplastic forming is accomplished by heating a material (which is often in the form of a relatively thin sheet) to a point of superplasticity, clamping the material within a sealed and heated tool, and then introducing pressurized gas to one side of the sheet of material to force the material to "stretch" or "flow" and take the shape of the forming tool surface. The gas pressure applied to the material to force it to stretch or flow is generally referred to as the forming pressure. In the automotive industry, magnesium alloy and aluminum alloy sheets are typically heated and superplastically formed in the temperatures range of 400 to 500 degrees Celsius. In the aerospace industry, titanium and titanium based alloys are heated and superplasticall formed in the temperature range of 800 to 950 degree Celsius.

While faster forming times may in some cases be achieved through increasing the forming pressure versus time rate, there are times during the forming process when relatively low pressures are preferred. For example, a lower deformation rate is desired when the material makes contact with the tool forming surface in locations of certain male shape tool face areas, as higher friction will be generated between the sheet material and the tool forming surface. In such cases, without stress-relief from the high friction of material to tool contact, the material could potentially be stretched too quickly resulting in tears, cracks, or a non-uniform product.

To ensure the material is deforming at a desired deformation rate (at a given temperature) it is known to in some cases to apply gas pressure on both sides of the sheet of material. As well, another known technique used to help control the deformation rate is to raise or lower the gas pressure on one, or both, sides of the sheet material using valves during specified times of the forming process. Such processes have met with varying degrees of success.

Despite advances in controlling the deformation rate of a sheet of material, the forming process often remains relatively slow. A complex automotive part, for instance, using aluminum or magnesium sheet materials, formed using a conventional superplastic forming process can require as much as 20 minutes to manufacture. As such, for the automotive industry, the use of a typical superplastic forming process is limited to producing high value parts, or parts for high valued automobiles.

SUMMARY

The invention, therefore, provides a method of forming a material in a superplastic forming tool, the method comprising applying pressurized gas at a baseline pressure to a surface of the material when the material is received within a cavity of a heated forming tool, and generating pressure fluctuations relative to the baseline pressure within the cavity using a supersonic fluidic oscillator, each pressure fluctuation (i) deforming the material and (ii) subsequently allowing for a partial stress relief of the material during the forming process.

There is also provided a system forming a material in a superplastic forming tool, the system comprising a supersonic fluidic oscillator which is configured to apply pressurized gas at a baseline pressure to a surface of the material when the material is received within a cavity of a heated forming tool, and to generate pressure fluctuations relative to the baseline pressure within the cavity. Each pressure fluctuation (i) deforms the material and (ii) subsequently allows for a partial stress relief of the material during the forming process. The system further includes a pressure control coupled to the supersonic fluidic oscillator for controlling the application of pressurized gas according to the baseline pressure.

There is further provided a method of forming a material in a superplastic forming tool, the method comprising applying pressurized gas at a baseline pressure to a surface of the material when the material is received within a cavity of a heated forming tool, and with a supersonic fluidic oscillator, creating pressure fluctuations within the cavity relative to the baseline pressure, the pressure fluctuations having a frequency from 1 Hz to 70 Hz and an amplitude of 0.01 psi to 0.50 psi, each pressure fluctuation (i) deforming the material and (ii) subsequently allowing for a partial stress relief of the material during the forming process.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of examples, to the accompanying drawings which show exemplary embodiments of the present invention in which:

FIGS. 2, 3, 4A, 4B, 4C and 4D are successive schematic views of an embodiment of a superplastic forming assembly during a forming cycle demonstrating the principal stages of the method of the present invention for forming a single part.

FIGS. 5, 6, 7A and 7B, are successive schematic views of an alternative embodiment of the superplastic forming assembly during a forming cycle demonstrating the principal stages of the method of the present invention for forming two parts.

DESCRIPTION

The present invention may be embodied in a number of different forms. The specification and drawings that follow describe and disclose some of the specific forms of the invention.

In the field of fluid dynamics, an emerging topic of interest is the study of fluidic diverter actuators for flow control. Two papers describing such research were published by NASA in 2010 and 2011, and are entitled "Numerical Studies of a Supersonic Fluidic Diverter Actuator for Flow Control"[1] and "Numerical Studies of an Array of Fluidic Diverter Actuators for Flow Control"[2], both of which are incorporated herein by reference. The papers describe the oscillatory behavior of flows through fluidic diverter actuators, also known as fluidic oscillators. Under some operating conditions such oscillators are known as supersonic fluidic oscillators.

[1] Prepared for the 5th Flow Control Conference sponsored by the American Institute of Aeronautics and Astronautics, Chicago, Ill., Jun. 28-Jul. 1, 2010
[2] Prepared for the 41st Fluid Dynamics Conference and Exhibit sponsored by the American Institute of Aeronautics and Astronautics, Honolulu, Hi., Jun. 27-30, 2011

Figure 1:
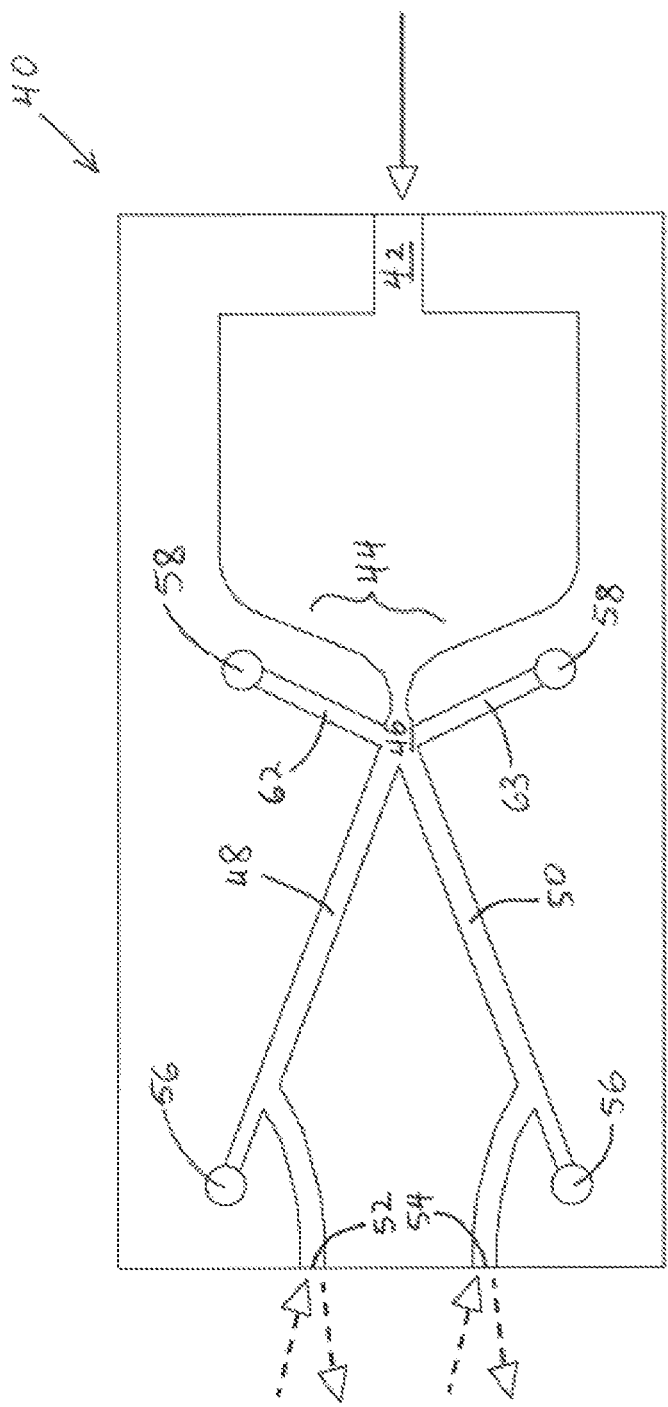
FIG. 1 is a schematic view of an exemplary supersonic fluidic oscillator.

To provide a better understanding of how a supersonic fluidic oscillator (SFO) works, a schematic of an exemplary supersonic fluidic oscillator 40 is depicted in FIG. 1. Fluid enters supersonic fluidic oscillator 40 through a supersonic fluidic oscillator inlet 42 as shown by the solid arrow. The jet of fluid (not shown) created at the end of a converging section 44 has a supersonic exit velocity and diverts alternately, or oscillates, at a fork 46 between output channels 48 and 50 due to the back pressure occurring alternately in each feedback tank (not shown) that is attached to the output channels 48 and 50 at ports 56. Jet flow through control channels 62 and 63 and exiting at ports 58 provides further control mechanism for the oscillation of the gas exiting SFO outlets 52 and 54. The jet of gas exits supersonic fluidic oscillator 40 alternately between SFO outlets 52 and 54 at particular frequencies and amplitudes of oscillation.

FIGS. 2, 3, 4A, 4B, 4C and 4D show an embodiment of a superplastic forming apparatus 10 for forming a single part, generally comprised of a chamber portion 12 and a tool portion 14. Chamber portion 12 includes a gas pressure sensor 16 and a gas oscillator 18. An injection pressure sensor 28, for detecting the pressure of gas that is directed into gas oscillator 18, is coupled to gas oscillator 18. A pressure controller 30 is coupled upstream to injection pressure sensor 28 and to gas pressure sensor 16. Tool portion 14 includes a tool forming surface 20. When chamber and tool portions 12 and 14 are clamped together, a sealed chamber 24 is formed.

FIGS. 5, 6, 7A and 7B, show an alternative embodiment of superplastic forming apparatus 10 (in this embodiment referenced as 110) for forming dual parts. Apparatus 110 is generally comprised of a chamber portion 112 and a tool portion 114. Chamber portion 112 includes a pair of gas pressure sensors 16 and gas oscillator 18. As in the case of the embodiment of FIGS. 2 through 4D, an injection pressure sensor 28, for detecting the pressure of gas that is directed into gas oscillator 18, is coupled to gas oscillator 18. A pressure controller 30 is also coupled upstream to injection pressure sensor 28 and to gas pressure sensors 16. Tool portion 114 includes a pair of tool forming surfaces 120. When chamber and tool portions 112 and 114 are clamped together, a pair of sealed chambers 122, 124 is formed (see, for example, FIG. 6). In the depicted embodiment, one gas pressure sensor 16 is situated in each of sealed chambers 122, 124 and gas oscillator 18 is in fluid communication with each sealed chamber 122, 124. As shown in the particular embodiment depicted in FIG. 6, the size and shape of sealed chambers 122, 124 are generally the same. They are also, in this embodiment, mirror images of one another about gas oscillator 18.

Figure 2:
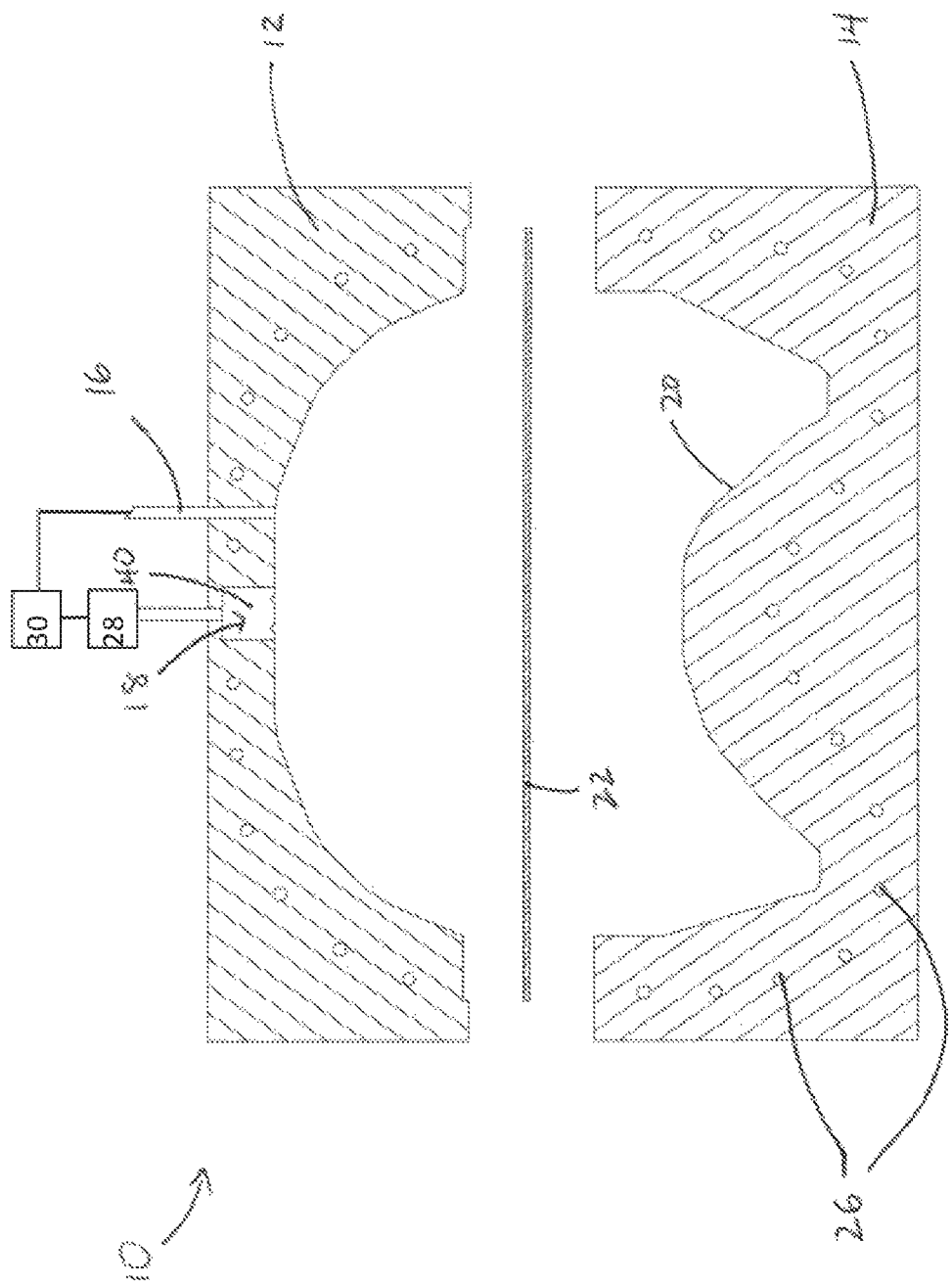
Figure 3:
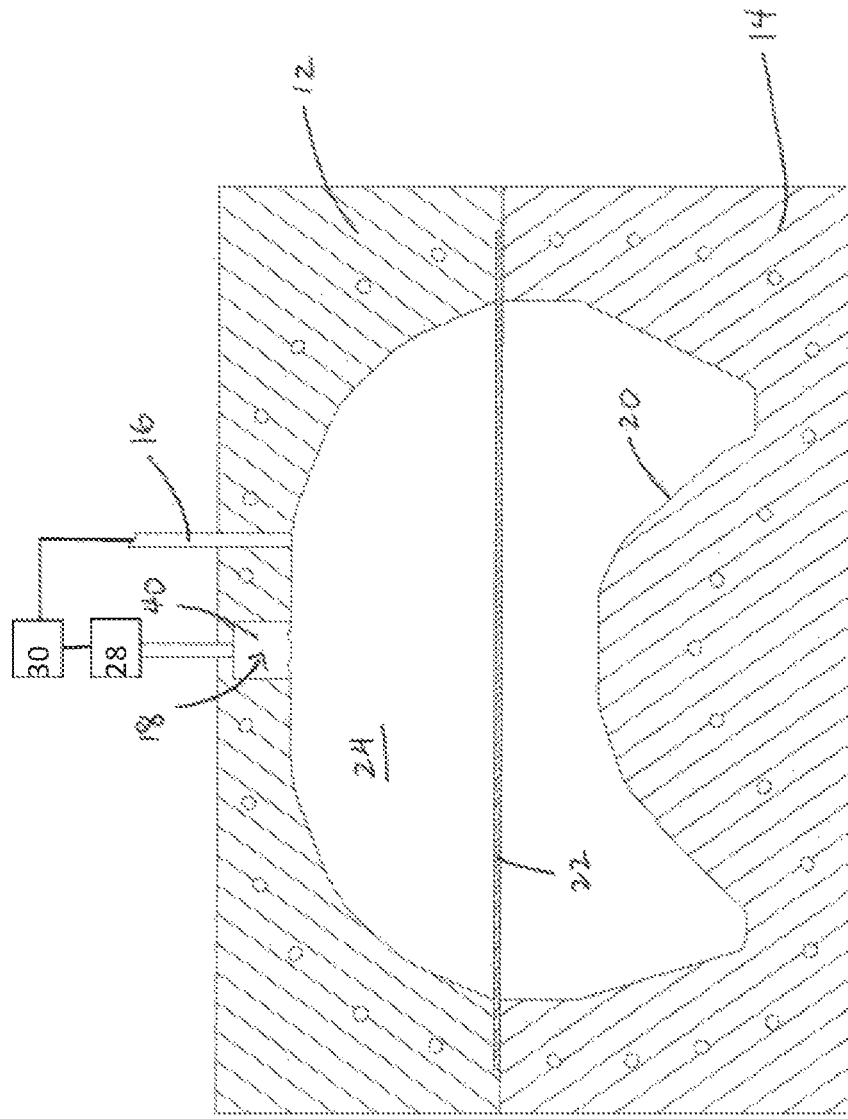

At the beginning of a typical superplastic forming process, a material 22 is placed between chamber portion 12 and tool portion 14, or between chamber portion 112 and tool portion 114, as shown in FIGS. 2 and 5. In the depicted embodiments, material 22, (which could commonly be aluminum or magnesium), is in the form of a sheet that is relatively thin when compared to its length and width. Other forms and types of material 22 could be used in alternate embodiments. Chamber and tool portions 12/112 and 14/114 are clamped together (as shown in FIGS. 3 and 6), securing material 22 in place and forming sealed chambers 24 and 122, 124. Material 22 is then heated to a predetermined forming temperature, placing material 22 generally in a state of superplasticity. Heating the material is typically achieved by heating chamber and tool portions 12/112 and 14/114, for example with embedded electrical resistance elements 26, however, it will be appreciated that other heating means could be utilized.

As shown in FIGS. 4A, 4B, 4C, 4D, 7A, and 7B, pressurized gas (noted by the solid arrow) is introduced into sealed chamber 24, or sealed chambers 122, 124, via gas oscillator 18. The pressurized gas establishes a baseline pressure within sealed chambers 24 and 122, 124. Pressure sensors 16, in both embodiments, measure the pressure within sealed chamber 24 or sealed chambers 122, 124 during the forming process. In order to maintain a desired pressure/time curve during the forming process, and to maintain the desired fluctuations or oscillations, a feedback mechanism is formed whereby pressure controller 30 monitors the pressure within the chambers via pressure sensor(s) 16 and, in conjunction with injection pressure sensor 28, controls the amount (or pressure) of pressurized gas injected into sealed chambers 24 and 122, 124 by gas oscillator 18.

Figure 8:
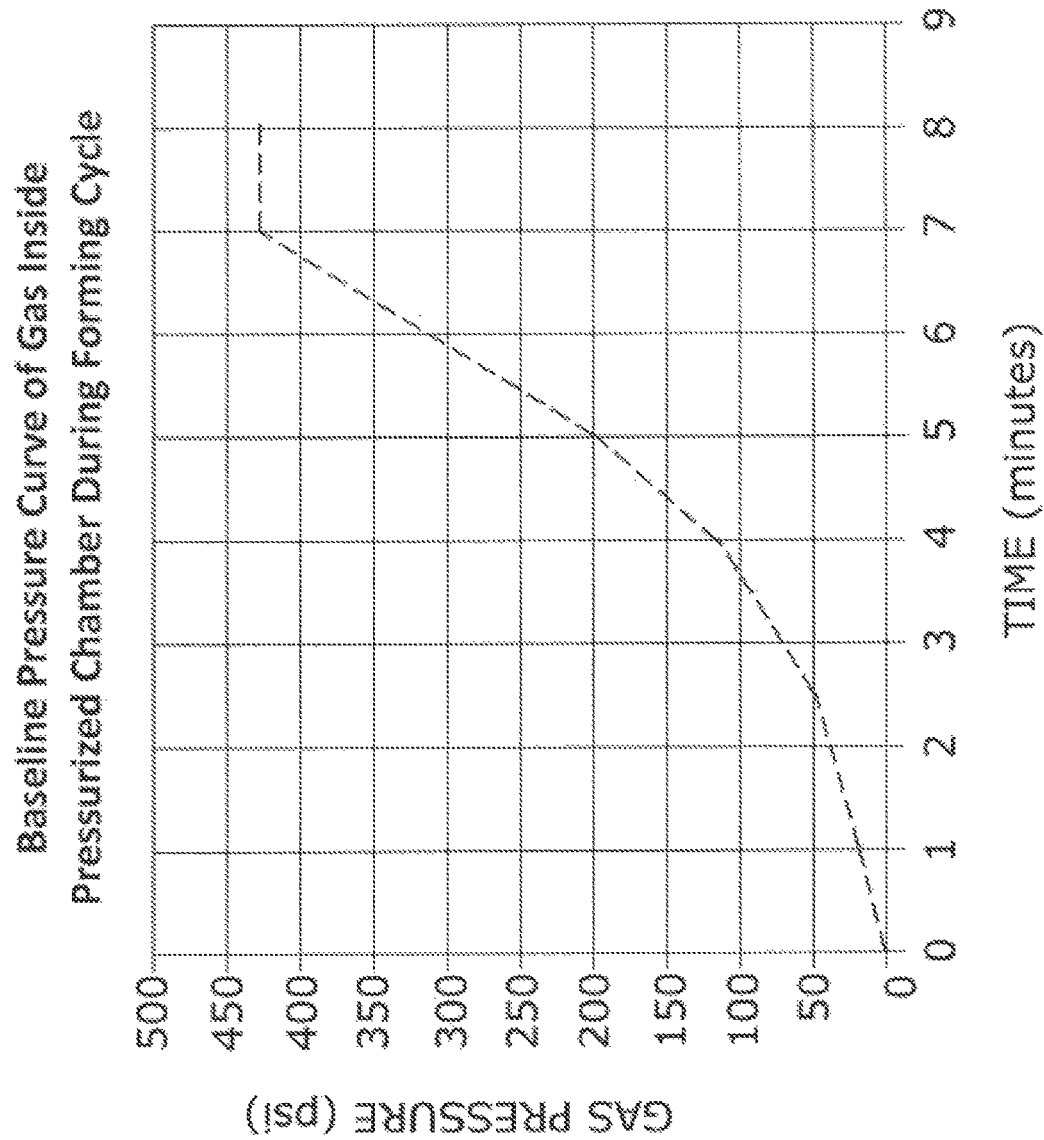
FIG. 8 is a graph showing an exemplary baseline pressure curve of the gas inside a pressurized chamber during a typical forming cycle.

In this manner, the pressurized gas acts on material 22, forcing material 22 to deform at a baseline deformation rate. A predetermined baseline pressure-time profile for an exemplary forming cycle is represented by the dashed line in FIG. 8.

As shown in the depicted embodiments, the pressure controller may be separate from gas oscillator 18 and outside forming apparatus 10/110. Injection pressure sensor 28, while shown to be outside the forming apparatus, may alternatively be within forming apparatus 10/110, so long as injection pressure sensor 28 is downstream from pressure controller 30 and upstream from gas oscillator 18.

In accordance with the invention, in the case of superplastic forming apparatus 10, as gas oscillator 18 injects gas into sealed chamber 24 to create and maintain the baseline pressure, gas oscillator 18 also injects, holds and withdraws small amounts of gas into and out of sealed chamber 24 as shown by the solid arrows in FIGS. 4A, 4B, 4C, and 4D, thereby generating pressure fluctuations. The pressure fluctuations applied by gas oscillator 18 cause the actual or overall gas pressure within sealed chamber 24 to fluctuate (or in some cases oscillate) relative to the baseline pressure. Any gas that is withdrawn from sealed chamber 24 by gas oscillator 18, as noted above, tends to be minute in comparison to the gas that is injected into the sealed chamber by gas oscillator 18.

In the case of superplastic forming apparatus 110, as gas oscillator 18 injects gas into sealed chambers 122, 124 to create and maintain a baseline pressure, gas oscillator 18 also injects, holds and withdraws small amounts of gas into and out of one sealed chamber, for example sealed chamber 122, while inversely withdrawing, holding and injecting small amounts of gas into and out of the other sealed chamber 124. In this manner, the fluctuating pressure applied by gas oscillator 18 causes the actual or overall gas pressure within sealed chambers 122 and 124 to inversely fluctuate, albeit slightly, relative to the baseline pressure. Any gas that is withdrawn from the sealed chambers by gas oscillator 18, as noted above, tends to be minute in comparison to the gas that is injected into the sealed chambers by gas oscillator 18.

Figure 9A:
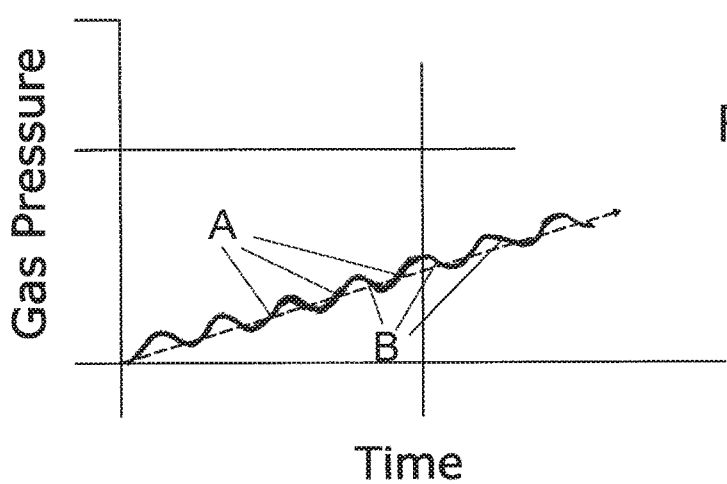
FIGS. 9A, 9B, and 9C are non-scale representations of pressure-time curves, each generally depicting an example relationship between a baseline pressure and a fluctuating forming pressure inside one pressurized chamber according to the present invention.
Figure 9B:
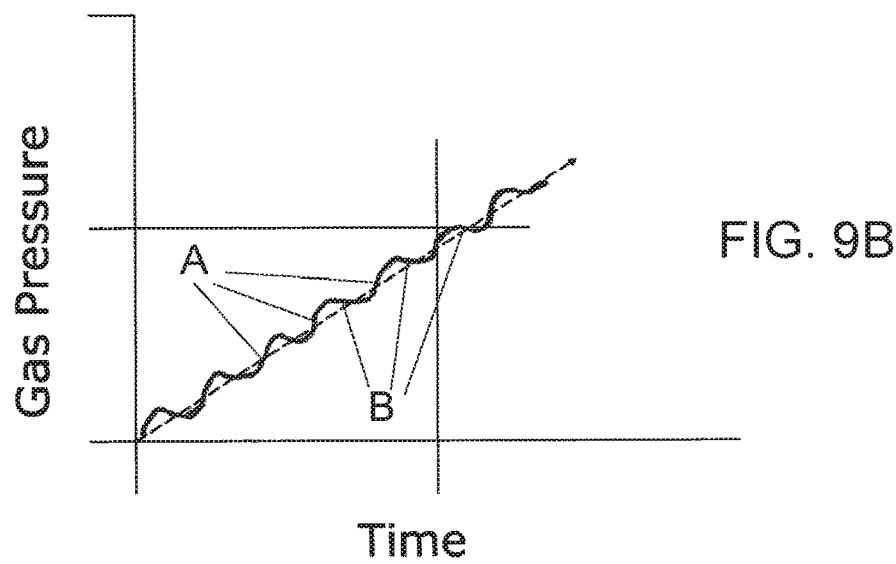
Figure 9C:
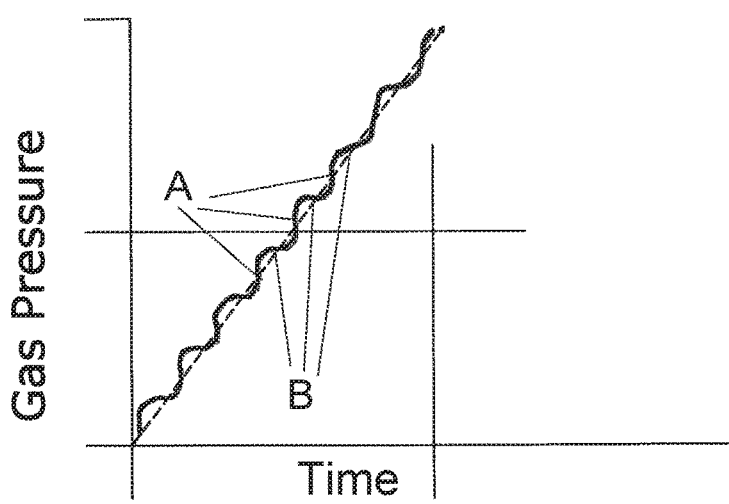

The forming pressure according to the present invention is thus a combination of the baseline pressure and the fluctuating pressure. The fluctuating pressure may be positive, close to equal, or in some circumstances, negative relative to the baseline pressure. FIGS. 9A 9B, and 9C are non-scale graphical representations of pressure-time curves, each depicting a relationship between the baseline pressure and the forming pressure which results according to the present invention in one sealed chamber. In FIGS. 9A, 9B, and 9C, the baseline pressure is indicated by the dashed line. The forming or actual pressure, depicted by the solid line, predominantly fluctuates back and forth between values above, close to equal, and, in certain instances, below the baseline pressure in accordance with the operation of gas oscillator 18. Typically, if the forming pressure dips below the baseline pressure during the forming process, the pressure drop tends to be small. FIG. 9A shows the baseline pressure and forming pressure for a relatively slow filling time. FIG. 9B shows the baseline pressure and forming pressure for a medium filling time. FIG. 9C shows the baseline pressure and forming pressure for a faster filling time.

As shown in FIGS. 9A to 9C, when gas is injected into sealed chambers 24, 122, or 124, the slope (i.e. rate of change) of the forming pressure is higher, as indicated by pressure inclines A. When the pressure in sealed chambers 24, 122, or 124 is "held" relatively constant, the slope (i.e. rate of change) of the forming pressure is small, zero, or possibly negative, as indicated by pressure holds B. In this manner, the forming pressure within sealed chambers 24, 122, or 124 is generally increasing throughout the forming process, but at fluctuating or oscillating rates of increase. A pressure incline followed by a pressure hold may be referred to as a pressure fluctuation cycle.

In the embodiments depicted in the attached Figures, gas oscillator 18 is supersonic fluidic oscillator (SFO) 40. As understood by one skilled in the art, the geometrical design of all internal gas flow channels within the SFO, the size of the SFO used, and/or the size of the feed back tanks attached to the SFO as described herein, can be customized according to the shape and volume of the associated sealed chamber(s) in order to maintain the desired pressure fluctuation cycles. As such, depending on the geometrical design of all internal gas flow channels within the SFO, on the size of the SFO, and/or on the size of the feed back tanks attached to the SFO, the pressure controller, the gas pressure sensor and the injection pressure sensor operate to maintain certain conditions within the SFO so that pressure fluctuations are maintained while the baseline pressure is simultaneously increased within the chambers.

Figure 4A:
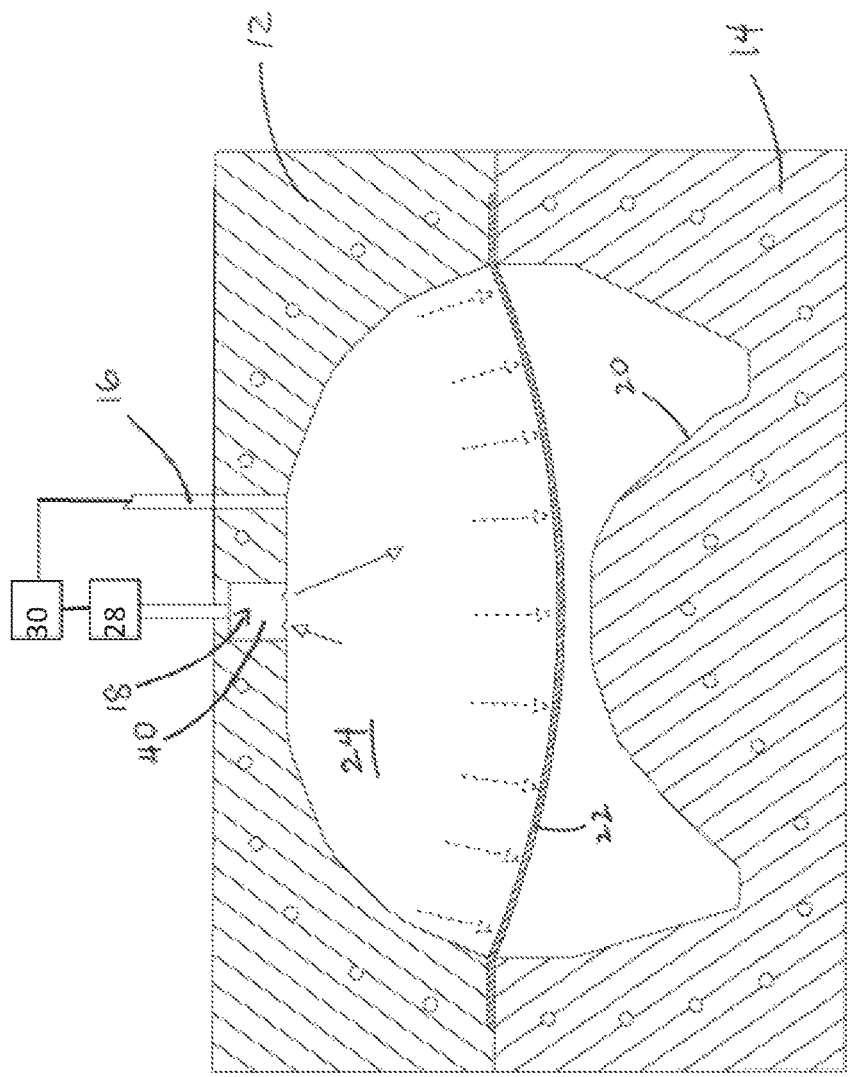
Figure 4B:
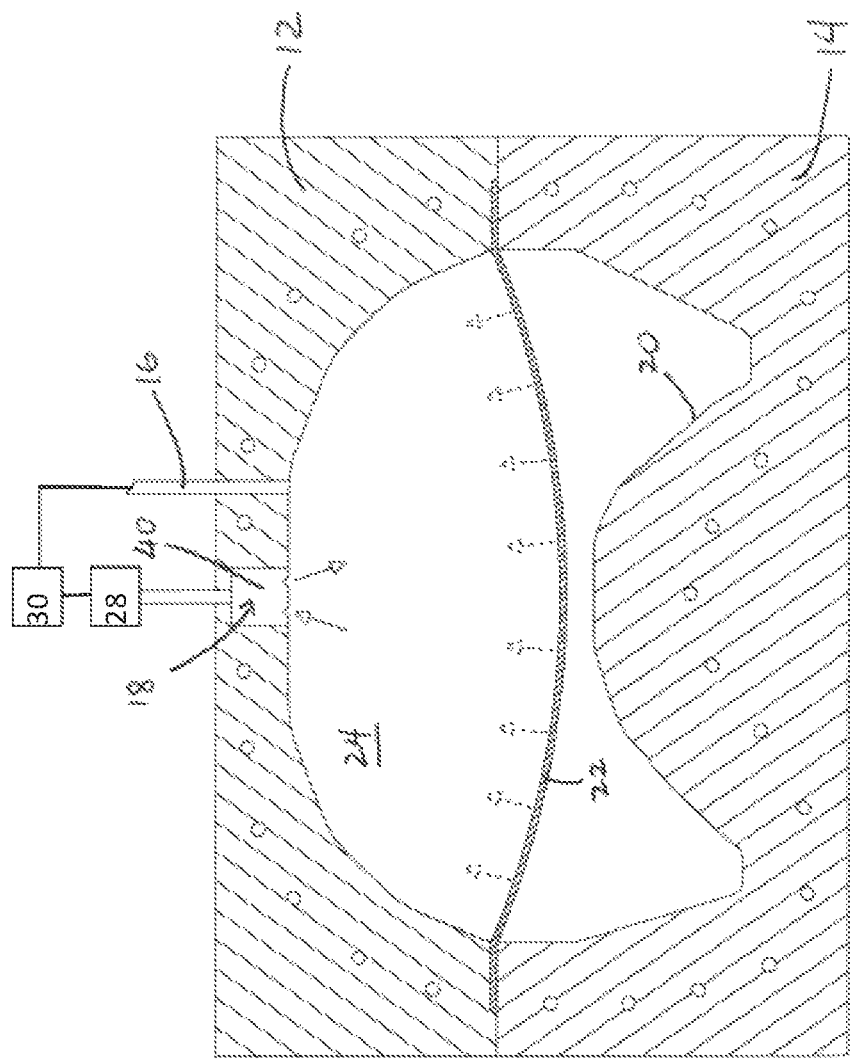
Figure 4D:
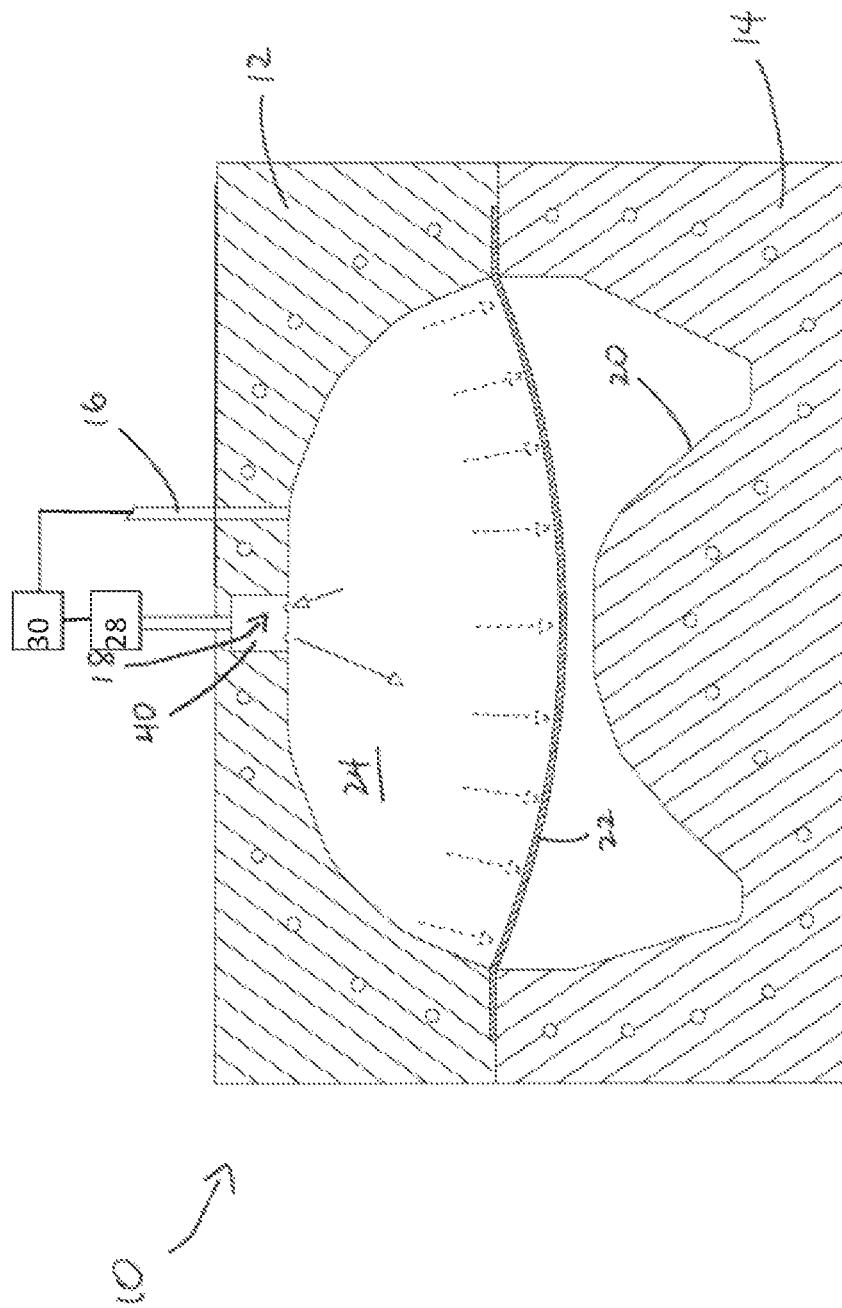

Referring again to the embodiment utilizing superplastic forming apparatus 10, when a jet of gas exits the SFO outlets, as depicted by the longer solid arrow in FIGS. 4A and 4D, the pressure within sealed chamber 24 momentarily spikes, corresponding to pressure inclines A shown in FIGS. 9A, 9B, and 9C. When the jet of gas transitions between SFO outlets 52 and 54, as depicted by the solid arrows in FIGS. 4B and 4C, the pressure within sealed chamber 24 is held relatively constant (i.e. drops slightly, increases slightly, or holds), corresponding to pressure holds B shown in FIGS. 9A, 9B, and 9C. As seen in FIGS. 9A, 9B, and 9C, during the pressure holds B, the forming pressure may slightly fall below the baseline pressure.

Figure 7A:
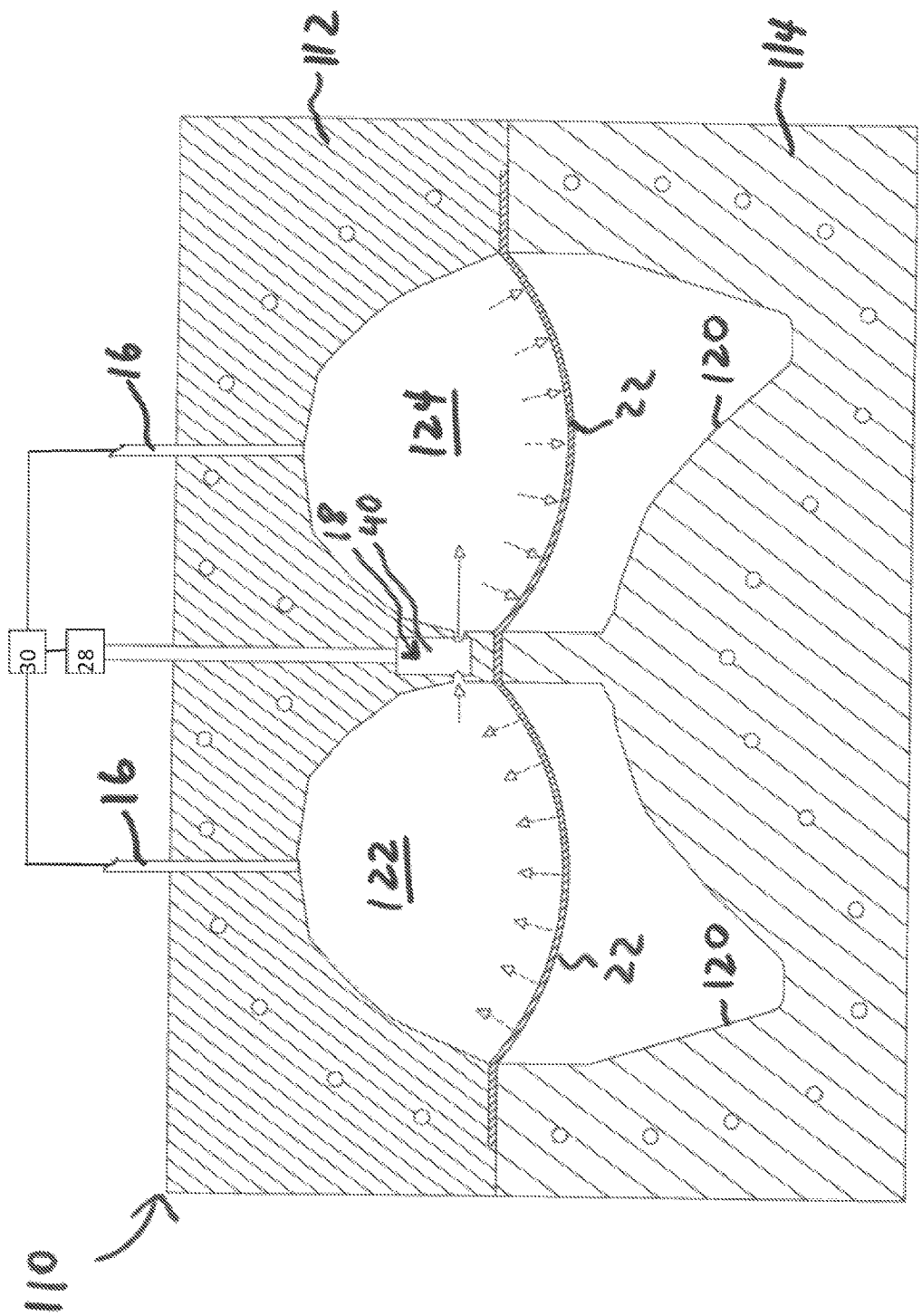
Figure 7B:
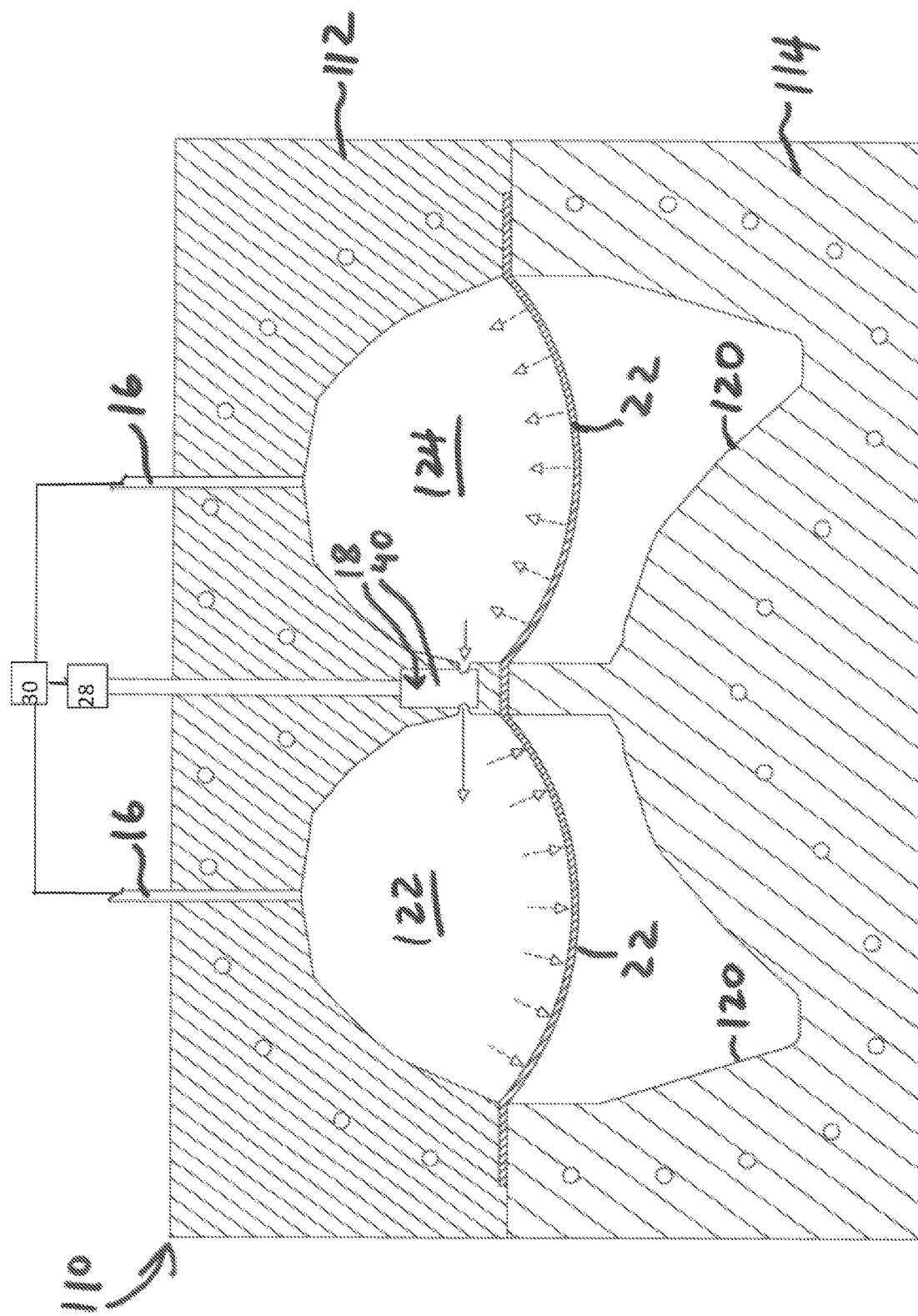

Turning now to the embodiment utilizing superplastic forming apparatus 110, when a jet of gas exits one of SFO outlets, as depicted by the longer solid arrow in FIG. 7A, the pressure within sealed chamber 124 momentarily spikes, corresponding to pressure inclines A, while the pressure within sealed chamber 122 momentarily is held relatively constant, corresponding to pressure holds B as shown in FIGS. 9A, 9B and 9C. When the jet of gas transitions to sealed chamber 122, as depicted by the longer solid arrow in FIG. 7B, the pressure within sealed chamber 122 momentarily spikes, corresponding to pressure inclines A while the pressure within sealed chamber 124 is held relatively constant, corresponding to pressure holds B as shown in FIGS. 9A, 9B and 9C. As noted above, during the pressure holds B in any one of sealed chamber 122/124, the forming pressure may slightly fall below the baseline pressure.

While supersonic fluidic oscillators are specifically discussed, wherein the gas within the supersonic fluidic oscillator may reach supersonic speeds, the feature of importance for the purposes of the present application is the generation of fluctuating pressure of gas within sealed chamber(s) 24 or 122, 124. As such, it will be understood by one skilled in the art that other devices, including subsonic fluidic oscillators, may be used to create the fluctuating pressure within sealed chambers 24 and 122, 124 of superplastic forming apparatus 10/110.

According to the present invention depicted in FIGS. 4A-4D, during operation of forming apparatus 10, the baseline pressure provides a constant source of forming pressure that is applied to material 22. Each pressure fluctuation resulting from the operation of supersonic fluidic oscillator 40 will generally enhance the deformation (i.e. increase the rate of deformation) of material 22 when the forming pressure within sealed chamber 24 is increased beyond the baseline pressure, as depicted by the dashed arrows in FIGS. 4A and 4D. Each pressure cycle will subsequently also allow for a partial stress relief of material 22 when the forming pressure within sealed chamber 24 is generally held constant.

In a similar manner, during operation of forming apparatus 110, the baseline pressure provides a constant source of forming pressure that is applied to material 22 in both sealed chambers 112 and 124. Each pressure fluctuation resulting from the operation of supersonic fluidic oscillator 40 will generally enhance the deformation of material 22 within sealed chamber 124 when the forming pressure within sealed chamber 124 is increased beyond the baseline pressure. This is depicted by the dashed arrows in sealed chamber 124 shown in FIG. 7A. At the same time, the forming pressure within sealed chamber 122 is held relatively constant, allowing for partial stress relief of material 22 in sealed chamber 122.

Each pressure fluctuation will subsequently allow the pressure between sealed chambers 122 and 124 to "alternate". For example, when the forming pressure within sealed chamber 122 is increased beyond the baseline pressure, (as depicted by the dashed arrows in sealed chamber 122 shown in FIG. 7B) the rate of deformation of material 22 will tend to be enhanced. At the same time, the forming pressure within sealed chamber 124 will be held relatively constant, allowing for partial stress relief of material 22 in sealed chamber 124.

The applicant has found that in a particular embodiment of the invention, a pressure fluctuation frequency of 1-70 Hz can be achieved within sealed chambers 24 and 122, 124.

The applicant has also found that an amplitude of pressure fluctuation between approximately 0.01 psi and 0.50 psi can be achieved within sealed chambers 24 and 122, 124.

In one embodiment, the pressure fluctuations are continuous and of a uniform frequency throughout the forming process. In another embodiment, the pressure fluctuations are continuous and of both a uniform frequency and a uniform amplitude throughout the forming process. In other embodiments, the frequency and/or the amplitude of the pressure fluctuations may be discontinuous and/or varied during the forming process. One of ordinary skill will understand that in this context "uniform" does not necessarily mean precisely and exactly identical, and that relatively small variations are contemplated.

A further advantage of the particular embodiment depicted in the attached drawings is that through use of supersonic fluidic oscillator 40, pressure fluctuations are created without the need for moving parts within the SFO. Given the relatively high temperatures at which the superplastic forming apparatus typically operates, moving parts may expand, warp and/or break-down during a forming cycle. Supersonic fluidic oscillator 40, on the other hand, does not use or require moving parts. Supersonic fluidic oscillator 40, when used in association with a superplastic forming apparatus, thus does not have moving parts that can break down under high operating temperature of the superplastic forming process. The frequency and amplitude characteristics of the gas exiting the SFO into the forming chamber 24 and 122, 124 will largely depend on the design of its internal geometry, the design of the feed back tanks, the design of the output channels 48 and 50, the design of control channels 62 and 63 and it ports 58, the inlet gas pressures to the SFO and the gas pressure within chamber 24 and 122, 124. This permits customization of the oscillator design for particular applications.

Various embodiments of the superplastic forming apparatus, according to the present invention, for forming multiple parts simultaneously are possible. Some of these possible embodiments are briefly described below.

In one particular variation of superplastic forming apparatus 10, the forming tool defines multiple sealed chambers which may be similar or nearly identical to one another in terms of shape and size. Each sealed chamber would typically also be operationally coupled to its own gas pressure sensor and gas oscillator. The gas oscillators may then be, collectively, coupled to a single pressure controller. In this manner, the pressure controller would receive pressure signals from the multiple gas pressure sensors and control the pressure and injection of the gas that is simultaneously directed through the multiple gas oscillators into the multiple sealed chambers. This allows similar pressure-time profiles to be applied in each of the multiple sealed chambers such that multiple parts having a similar (or identical) shape and size may be formed at approximately the same time.

In another particular variation of superplastic forming apparatus 10, each cavity or sealed chamber within the forming tool may be different in terms of its shape and/or size. In such a case, each sealed chamber would typically be operationally coupled to its own gas pressure sensor, its own gas oscillator and its own pressure controller. In this manner, each pressure controller would receive pressure signals from its associated gas pressure sensors and control the pressure and injection of gas through its associated gas oscillator into its associated sealed chamber. This allows different pressure-time profiles to be applied in each of the multiple, differently shaped and/or sized, sealed chambers such that multiple parts having different shapes and/or sizes may be formed at approximately the same time.

In another variation of superplastic forming apparatus 110, the forming tool may also define multiple pairs of sealed chambers which may be similar or nearly identical to other sealed chamber pairs in terms of shape and size. Each sealed chamber pair would typically also be operationally coupled to its own gas pressure sensors and gas oscillator. The gas oscillators may then be, collectively, coupled to a single pressure controller. In this manner, the pressure controller would receive pressure signals from the multiple gas pressure sensors and control the pressure and injection of the gas simultaneously directed through the multiple gas oscillators into the multiple pairs of sealed chambers. This allows similar pressure-time profiles to be applied in each of the multiple sealed chamber pairs such that multiple parts having a similar (or identical) shape and size may be formed at approximately the same time.

In another variation of superplastic forming apparatus 110, each pair of sealed chambers within the forming tool may be different from other sealed chamber pairs in terms of shape and/or size. In such a case, each sealed chamber pair would be operationally coupled to its own gas pressure sensors, its own gas oscillator and its own pressure controller. In this manner, each pressure controller would receive pressure signals from its associated gas pressure sensors and control the pressure and injection of gas through its associated gas oscillator into its associated sealed chamber pair. This allows different pressure-time profiles to be applied in each of the multiple, differently shaped and/or sized, sealed chamber pairs such that multiple parts having different shapes and/or sizes may be formed at approximately the same time.

An advantage of forming multiple parts simultaneously within the tool is that it allows for higher productivity of formed parts for each forming cycle.

It is to be understood that what has been described are the preferred embodiments of the invention. The scope of the claims should not be limited by the preferred embodiments set forth above, but should be given the broadest interpretation consistent with the description as a whole.

The invention claimed is:

1. A method of forming a material in a superplastic forming tool, the method comprising:
    applying pressurized gas at a baseline pressure to a surface of the material when the material is received within a cavity of the superplastic forming tool; and
    generating pressure fluctuations relative to the baseline pressure within the cavity using a supersonic fluidic oscillator in direct communication with the superplastic forming tool, each pressure fluctuation (i) deforming the material and (ii) subsequently allowing for a partial stress relief of the material during the forming process.

2. The method of claim 1 wherein a frequency of the pressure fluctuations is from 1 Hz to 70 Hz.

3. The method of claim 1 wherein an amplitude of the pressure fluctuations is between 0.01 psi and 0.50 psi.

4. The method of claim 1 further comprising increasing the baseline pressure according to a predetermined pressure-time profile.

5. The method of claim 1 wherein the pressure fluctuations are continuous throughout the forming process.

6. A system for forming a material in a superplastic forming tool, the system comprising:
- a supersonic fluidic oscillator in direct communication with the superplastic forming tool and configured to:
  - apply pressurized gas at a baseline pressure to a surface of the material when the material is received within a cavity of the superplastic forming tool, and
  - generate pressure fluctuations relative to the baseline pressure within the cavity, each pressure fluctuation (i) deforming the material and (ii) subsequently allowing for a partial stress relief of the material during the forming process; and
- a pressure controller coupled to the supersonic fluidic oscillator for controlling the application of the pressurized gas according to the baseline pressure.

7. The system of claim 6 wherein the supersonic fluidic oscillator operates to simultaneously apply the pressurized gas at the baseline pressure and to generate the pressure fluctuations.

8. The system of claim 6 wherein the pressure fluctuations have a frequency between 1 Hz and 70 Hz.

9. The system of claim 6 wherein the pressure fluctuations have an amplitude between 0.01 psi and 0.50 psi.

10. The system of claim 6 wherein the pressure controller causes the supersonic fluidic oscillator to increase the baseline pressure according to a predetermined pressure-time profile.

11. The system of claim 6, further comprising a pressure sensor positioned within the cavity of the superplastic forming tool.

12. The system of claim 6, wherein the superplastic forming tool comprises multiple cavities and the supersonic fluidic oscillator is configured to apply the pressurized gas and to generate to pressure fluctuations in the pressure of the pressurized gas within the multiple cavities of the forming tool.

13. A method of forming a material in a superplastic forming tool, the method comprising:
- applying pressurized gas at a baseline pressure to a surface of the material when the material is received within a cavity of the superplastic forming tool; and
- with a supersonic fluidic oscillator, in direct communication with the superplastic forming tool, creating pressure fluctuations within the cavity relative to the baseline pressure, the pressure fluctuations having a frequency from 1 Hz to 70 Hz and an amplitude of 0.01 psi to 0.50 psi, each pressure fluctuation (i) deforming the material and (ii) subsequently allowing for a partial stress relief of the material during the forming process.

14. The method as claimed in claim 13 wherein the pressure fluctuations are continuous throughout the forming process.

15. A method of forming a material in a superplastic forming tool, the method comprising:
- applying pressurized gas at a baseline pressure to a surface of the material to form the material when the material is received within a cavity of the forming tool; and
- generating pressure fluctuations relative to the baseline pressure within the cavity using a supersonic fluidic oscillator in direct communication with the superplastic forming tool.

16. The method as claimed in claim 15, wherein each pressure fluctuation deforms the material.

17. The method as claimed in claim 16, where each pressure fluctuation allows for a partial stress relief of the material during the forming process.

* * * * *